Dec. 6, 1938.　　　　I. L. DAWSON　　　　2,139,491
FLUE STOP AND FIRE CHECK
Filed Dec. 11, 1937
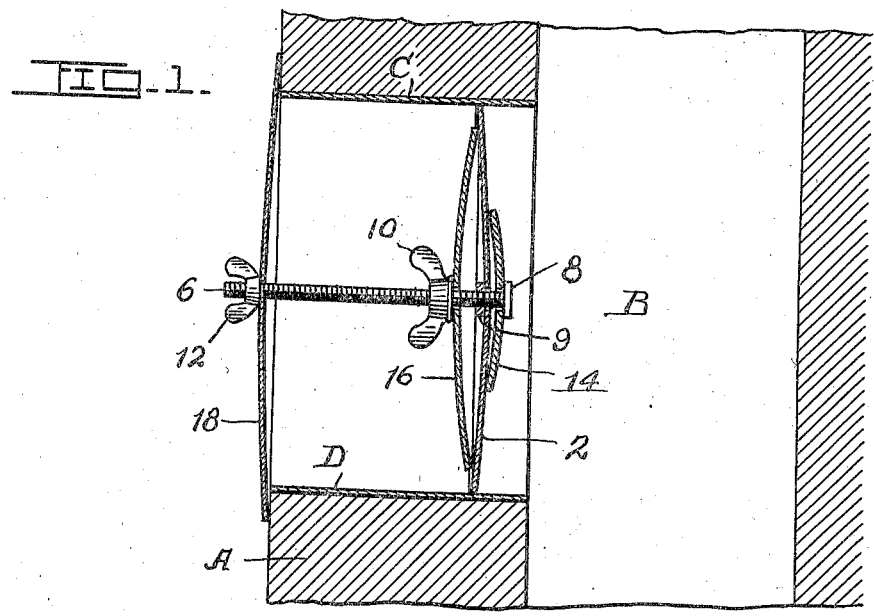
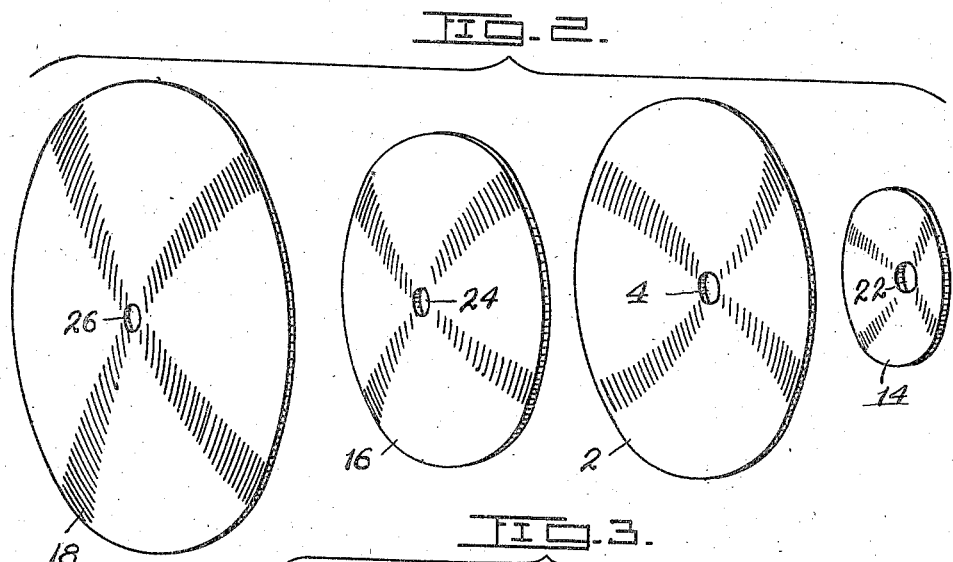
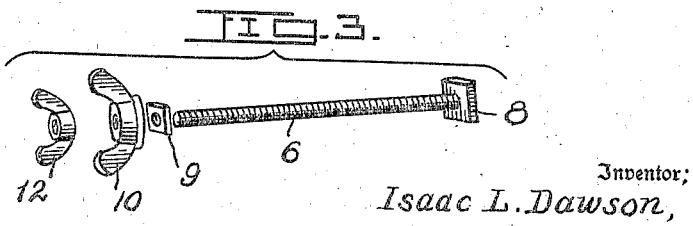
Inventor;
Isaac L. Dawson,
F. G. Fischer,
Attorney.

Patented Dec. 6, 1938

2,139,491

UNITED STATES PATENT OFFICE 2,139,491

FLUE STOP AND FIRE CHECK

Isaac L. Dawson, Lawrence, Kans.

Application December 11, 1937, Serial No. 179,311

6 Claims. (Cl. 126—319)

My invention relates to a combination flue-stop and fire-check and one object is to provide a simple and inexpensive fire-proof device of this character which is adapted to effectually prevent the escape of smoke, soot, sparks and flames from the lateral stove-pipe opening leading from a chimney-flue into the room.

A further object is to provide a device of this character which is sufficiently flexible to accommodate ordinary differences in the internal diameter of thimbles with which the lateral openings are usually lined, so that it will not be necessary to make the devices in many different sizes.

Another object is to arrange the fire-check portion of the device in such manner that it may be used independently of the flue-stop portion.

Other objects will hereinafter appear, and in order that the invention may be fully understood reference will now be had to the accompanying drawing in which:

Fig. 1 is a broken vertical section of a chimney-flue with my device installed in the thimble thereof.

Fig. 2 is a perspective view of four members employed in carrying out the invention.

Fig. 3 is a perspective view of a bolt and nuts for holding the four members in assembly.

Referring in detail to the different parts shown by the drawing, A designates a portion of a chimney having a flue B with a lateral stove-pipe opening C lined with the customary thimble D adapted to receive the upper end of an ordinary stove-pipe, not shown.

Referring now more particularly to the parts constituting the present invention, 2 designates a disc of concavo-convex configuration provided with an axial aperture 4. The disc 2 is preferably constructed of flexible or resilient sheet metal so that after being inserted in the thimble D it may be expanded to fit tightly within said thimble.

An element 6, in the form of a bolt provided with a head 8, is adapted to extend loosely through the aperture 4 of the disc 2. Nuts 9, 10 and 12 are adapted to be threaded upon the bolt 6 for a purpose which will hereinafter appear.

14, 16 and 18 designate three members having axial openings 22, 24 and 26, respectively, through which the bolt 6 is adapted to extend as shown by Fig. 1. The members 14, 16 and 18 are preferably constructed of sheet metal of greater rigidity than the disc 2 so that they will expand but very little if any when subjected to pressure to expand said disc, as will hereinafter appear. Said members 14, 16 and 18 are preferably arranged in the form of discs of concavo-convex configuration.

The member 14 is preferably of less diameter than the member 16, which is of less diameter than the disc 2. The member 18 is of greater diameter than the thimble B so that when in active position it will completely close the outer end of said thimble and the lateral opening C.

In assembling and installing the device the members 14 and 2 are placed upon the bolt 6 in the order named with their convex surfaces towards the bolt-head 8. They are then pushed backwardly until checked by the member 14 contacting the bolt-head 8 against which it is firmly held by screwing nut 9 upon the bolt until member 2 is pressed tightly against member 14. Member 16 is then placed upon bolt 6 with the concave surface first, after which thumb-nut 10 is screwed upon the bolt until it lightly presses member 16 against member 2. The three members are then inserted edgewise in the thimble D to the desired depth, after which they are turned until the bolt 6 is in axial alinement with the axis of the thimble. Nut 10 is next screwed firmly against the member 16 until the same and member 14 have expanded the intermediate disc 2 to such extent as to fit so tightly within the thimble D, that it cannot be withdrawn unless the nut 10 is loosened. When the thumb-nut 10 is being screwed firmly against the member 16 with one hand the bolt 6 serves as a handle which may be held with the other hand to keep the bolt 6 and the members 2, 14 and 16 from rotating with the nut 10. The member 18 is then placed upon the bolt 6 and forced tightly against the face of the chimney A (Fig. 1) by means of the nut 12 which is screwed upon the outer end of the bolt 6.

When properly installed it is apparent that the device forms a reliable flue-stop and fire-check which will prevent the escape of soot and fire from flue B through the thimble D in the event that a stove, or furnace connected to the lower portion of the chimney becomes overheated.

Obviously changes may be made such as dispensing with the bolt head 8 and securing the member 14 permanently upon the bolt 6. Nut 12 and member 18 may also be dispensed with, but I prefer to retain them as the member 18 presents a neater appearance than the open end of the thimble D.

From the foregoing description, taken in connection with the drawing, it is apparent that I have provided a device which is well adapted for the purpose intended, and while I have shown a preferred form of the device I reserve all rights to such other forms and modifications as properly fall within the spirit and scope of the invention as claimed.

Having thus described my invention, what I claim and desire to secure by Letters Patent, is:—

1. A device of the character described comprising an expansible concavo-convex disc adapted to be placed in the lateral opening of a concavo-convex chimney-flue, a member engaging the convex surface of said disc and of greater rigidity than the latter, a circular member engaging the concave surface of the disc and of greater rigidity than the latter, a bolt extending through alined axial openings in the above members and said disc and means on said bolt adapted to force said members tightly against the disc and thereby expand the same firmly into engagement with the inner surface of the surrounding wall of the lateral opening.

2. A device of the character described comprising an expansible concavo-convex disc having an axial opening and adapted to be placed in the lateral opening of a chimney-flue, a circular member having an axial opening and engaging the convex surface of said disc, a circular member having an axial opening and engaging the concave surface of the disc, a threaded element extending through said axial openings, and adjustable means on said element adapted to coact therewith in forcing the members tightly against the disc thereby expanding the same firmly into engagement with the surrounding wall of the lateral opening.

3. A device of the class described comprising a flexible intermediate member of concavo-convex form adapted to be expanded in a flue-thimble to seal the same, a dished member of less diameter than the intermediate member and fitted to the convex face thereof, a circular member of less diameter but greater stiffness than the intermediate member and fitted to the concave face thereof, a bolt extending through alined holes in the above members and provided with means which bear against the convex face of the dished member, and an element threaded upon and adapted to coact with said bolt in expanding the intermediate member by pressing the other two members firmly against the opposite faces of said intermediate member.

4. A device of the class described comprising a flexible intermediate member of concavo-convex form adapted to be expanded in a flue-thimble to seal the same, a second member of less diameter but greater stiffness than the intermediate member and fitted to the convex face thereof, a circular member of less diameter but greater stiffness than the intermediate member and fitted to the concave face thereof, a bolt extending through alined holes in the above members and provided with means which bear against the rear face of the second member, and a nut threaded upon and adapted to coact with said bolt in expanding the intermediate member by pressing the other two members firmly against the opposite faces of said intermediate member.

5. A device of the class described comprising a flexible intermediate member of concavo-convex form adapted to be expanded in a flue-thimble to seal the same, a dished member of less diameter than the intermediate member and fitted to the convex face thereof, a circular member of less diameter but greater stiffness than the intermediate member and fitted to the concave face thereof, a bolt extending through alined holes in the above members and provided with means which bear against the convex face of the dished member, a nut threaded upon the bolt and bearing against the concave face of the intermediate member, and an element threaded upon and adapted to coact with said bolt in expanding the intermediate member by pressing the other two members firmly against the opposite faces of said intermediate member.

6. A device of the class described comprising a flexible intermediate member of concavo-convex form adapted to be expanded in a flue-thimble to seal the same, a dished member of less diameter than the first-mentioned member and fitted to the convex face thereof, a bolt threaded substantially its entire length and extending through alined holes in the intermediate and dished shaped members respectively, provided with a head bearing against the rear surface of the last-mentioned member, a nut threaded upon said bolt and bearing against the convex face of the intermediate member to hold the same and the dished member in tight assembly, a circular member loosely mounted upon the bolt and of less diameter but greater stiffness than the intermediate member against the concave face of which it is fitted, a thumb-nut threaded upon the bolt and adapted to coact therewith in expanding the intermediate member into frictional engagement with the inner surface of the thimble by pressing the other two members firmly against said intermediate member, said bolt providing a handle whereby the intermediate member may be held from rotation with the thumb-nut, a circular member loosely mounted upon the outer end of the bolt and close to the adjacent end of the thimble, and means threaded upon the bolt and adapted to press the last-mentioned member firmly against the face of the flue.

ISAAC L. DAWSON.